(12) United States Patent
Smith

(10) Patent No.: US 12,086,188 B2
(45) Date of Patent: *Sep. 10, 2024

(54) GENERATION OF REGULAR EXPRESSIONS

(71) Applicant: salesforce.com, inc., San Francisco, CA (US)

(72) Inventor: Jonathan Dean Smith, Katy, TX (US)

(73) Assignee: Salesforce, Inc., San Francisco, CA (US)

( * ) Notice: Subject to any disclaimer, the term of this patent is extended or adjusted under 35 U.S.C. 154(b) by 528 days.

This patent is subject to a terminal disclaimer.

(21) Appl. No.: 17/372,830

(22) Filed: Jul. 12, 2021

(65) Prior Publication Data

US 2021/0342402 A1 Nov. 4, 2021

Related U.S. Application Data

(63) Continuation of application No. 16/423,422, filed on May 28, 2019, now Pat. No. 11,086,939.

(51) Int. Cl.
*G10L 15/22* (2006.01)
*G06F 16/903* (2019.01)
*G06F 40/30* (2020.01)

(52) U.S. Cl.
CPC ........ *G06F 16/90344* (2019.01); *G06F 40/30* (2020.01)

(58) Field of Classification Search
None
See application file for complete search history.

(56) References Cited

U.S. PATENT DOCUMENTS

| | | | |
|---|---|---|---|
| 7,451,487 B2 * | 11/2008 | Oliver | G06F 21/51 709/206 |
| 7,730,478 B2 | 6/2010 | Weissman | |
| 7,779,039 B2 | 8/2010 | Weissman et al. | |
| 8,856,928 B1 * | 10/2014 | Rivner | G06Q 50/01 713/193 |
| 9,026,547 B2 * | 5/2015 | Roloff | G06F 16/3325 707/767 |
| 10,341,355 B1 | 7/2019 | Niemoller et al. | |
| 2009/0276072 A1 * | 11/2009 | Grove | G05B 19/042 700/99 |
| 2009/0288084 A1 | 11/2009 | Astete et al. | |
| 2013/0133026 A1 | 5/2013 | Burgess | |

(Continued)

*Primary Examiner* — Neeraj Sharma
(74) *Attorney, Agent, or Firm* — Haynes and Boone, LLP

(57) ABSTRACT

A method is provided for generating regular expressions. In some embodiments, the method includes partitioning a first plurality of text strings into a plurality of substrings, each text string of the first plurality being malignant or benign. The method also includes generating a population list including a second plurality of text strings, each text string of the second plurality including at least one token. The method further includes creating subsequent iterations of the population list. Each iteration may include calculating a score for one or more text strings in the population list and removing one or more text strings from the population list. The method further includes in response to a determination to not update the population list, selecting, based on the one or more calculated scores, a third text string as a regular expression from a final iteration of the population list.

16 Claims, 9 Drawing Sheets

(56) References Cited

U.S. PATENT DOCUMENTS

| | | | |
|---|---|---|---|
| 2014/0146987 A1* | 5/2014 | Pontoppidan | H04R 25/30 |
| | | | 381/314 |
| 2015/0264084 A1 | 9/2015 | Kashyap et al. | |
| 2017/0060839 A1* | 3/2017 | Kawamura | G10L 25/63 |
| 2017/0147682 A1* | 5/2017 | Alaqeeli | G06F 40/30 |
| 2017/0364698 A1 | 12/2017 | Goldfarb et al. | |
| 2019/0034601 A1 | 1/2019 | Coleman et al. | |
| 2020/0042737 A1 | 2/2020 | Lee et al. | |
| 2020/0092325 A1 | 3/2020 | Kolingivadi et al. | |
| 2020/0242269 A1 | 7/2020 | Narayanaswamy | |
| 2020/0296026 A1 | 9/2020 | Michael et al. | |
| 2020/0334123 A1 | 10/2020 | Chatterjee et al. | |
| 2020/0366682 A1 | 11/2020 | Aggarwal et al. | |
| 2021/0281577 A1* | 9/2021 | Sasaki | H04L 63/0435 |

\* cited by examiner

GENERATION OF REGULAR EXPRESSIONS

CROSS REFERENCE(S)

This application is a continuation of and claims priority under 35 U.S.C. 120 to co-pending and commonly-owned U.S. nonprovisional application Ser. No. 16/423,422, filed May 28, 2019, which is hereby expressly incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a computing device, and more specifically to systems and methods for generating regular expressions.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

A regular expression is a sequence of characters that defines a search pattern. The search pattern may be used by string searching algorithms for "find" or "find and replace" operations on strings, or for input validation. In an example, a regular expression system may apply regular expressions as a checking method to ensure that data associated with a particular tenant does not bleed across separate tenants in the multi-tenant database system.

Figure 1:
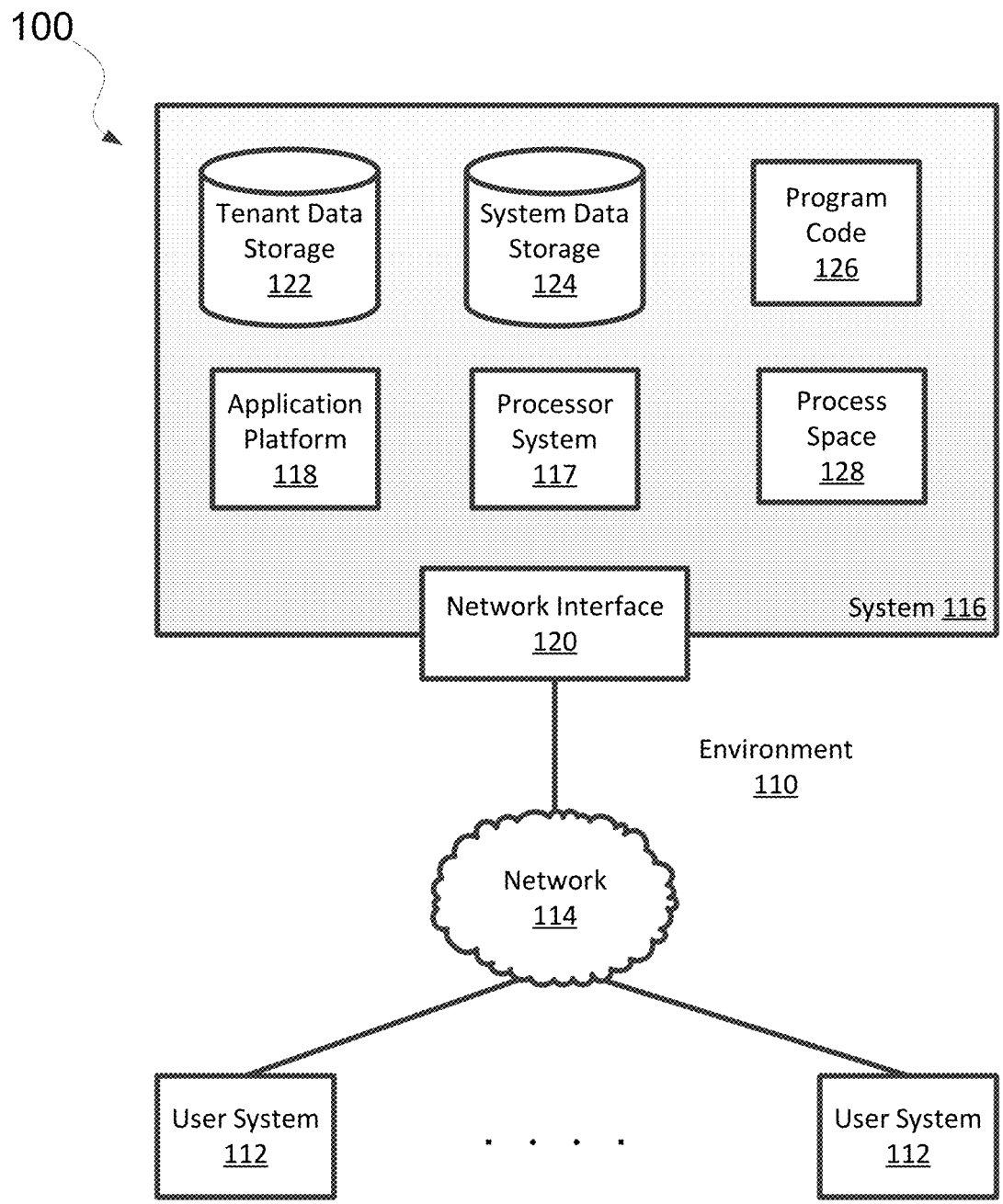
FIG. 1 illustrates a block diagram of an example environment according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

I. Example Environment

The system and methods of the present disclosure can include, incorporate, or operate in conjunction with or in the environment of a database, which in some embodiments can be implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously support multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational database management system (RDBMS) or the equivalent may execute storage and retrieval of information against the database object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I," that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a MTS, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 116 may provide tenant access to multiple hosted (standard and custom) applications, including a CRM application. User (or third-party developer) applications, which may or may not include CRM, may be supported by the application platform 118, which manages creation, storage of the applications into one or more database objects, and execution of the applications in a virtual machine in the process space of the system 116.

One arrangement for elements of the system 116 is shown in FIG. 1, including the network interface 120, the application platform 118, the tenant data storage 122 for tenant data, the system data storage 124 for system data accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, personal digital assistant (PDA), cell-phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the MTS) of the user systems 112 to access, process, and view information, pages, and applications available to it from the system 116 over the network 114. Each of the user systems 112 also typically includes one or more user interface devices, such as a keyboard, mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit (CPU) such as an Intel Pentium® processor or the like. Similarly, system 116 (and additional instances of an MTS, where more than one is present) and all of their components might be operator configurable using application(s) including computer code to run using a CPU such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented database management system (OODBMS) or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
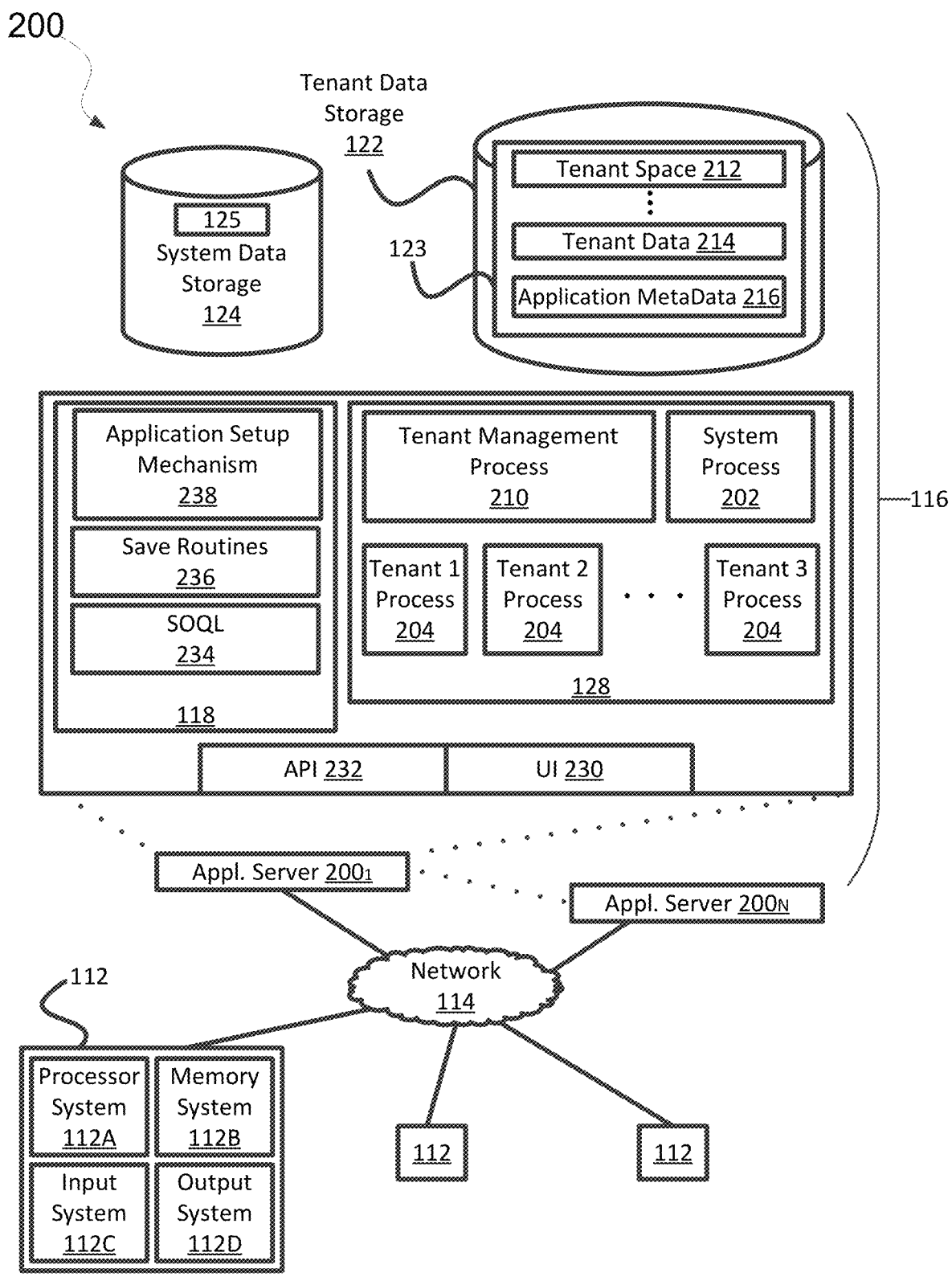
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, tenant data 123, system data storage 124, system data 125, a user interface (UI) 230, an application program interface (API) 232, a Salesforce.com object query language (SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIGS. 1 and 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access the tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using SOQL 234 that provides a programming language style interface extension to the API 232. Some embodiments of SOQL language are discussed in further detail in U.S. Pat. No. 7,730,478, filed September 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. TCP/IP are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, where the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement in which all the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a CRM system, for example, these categories or groupings can include various standard entities, such as account, contact, lead, opportunity, group, case, knowledge article, etc., each containing pre-defined fields. For example, a CRM database may include a table that describes a customer with fields for basic contact information such as name, address, phone number, fax number, etc. Another table might describe a purchase order, including fields for information such as customer, product, sale price, date, etc. In some MTS, standard entity tables might be provided for use by all tenants.

In some MTSs, tenants may be allowed to create and store custom objects, or they may be allowed to customize standard entities or objects, for example by creating custom fields for standard objects, including custom index fields. Systems and methods for creating custom objects as well as customizing standard objects in a MTS are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Generation of Regular Expressions

A regular expression is a sequence of characters that defines a search pattern. The search pattern may be used by string searching algorithms for "find" or "find and replace" operations on strings, or for input validation. A regular expression system may apply regular expressions as a checking method to ensure that data associated with a particular tenant does not bleed across separate tenants.

In an example, first data associated with the first tenant is classified as "good" data and second data associated with the second tenant is classified as "bad" data. In this example, if the types of data between the first and second tenants using the MTS are different enough, the regular expression system may come up with a heuristic to determine whether outgoing data belongs to the proper tenant. In another example, the regular expression system may apply regular expressions to check data packets leaving the MTS and predict which tenant was the owner of the data packets. In another example, the regular expression system may apply regular expressions on database queries prior to execution to ensure that tenants or malicious actors are not trying to actively (or accidentally) access another tenant's data.

Another example in which regular expressions may be used is in the security context. For example, a web application firewall may store internal rules in the MTS. Each tenant in the MTS may have its own set of internal rules, which may include regular expressions for detecting attacks. The web application firewall receives URLs from traffic sources, a URL being a request for a webpage stored at a destination server associated with a particular tenant. The web application firewall retrieves the particular tenant's internal rules and applies, based on the tenant's internal rules, a set of regular expressions to the URL to determine whether the URL includes an attack string. If a regular expression matches the URL, the web application firewall determines that the URL is an attack string and does not pass the URL along to the destination server. If no regular expressions of the set match the URL, the web application firewall passes the URL along to the destination server for retrieval and return of the webpage stored at the destination server. Accordingly, the web application firewall may filter out attack strings using regular expressions.

The generation of regular expressions may involve a degree of creativity and intuition. Accordingly, it may be difficult to generate optimal regular expressions that detect text string patterns that are not known beforehand. The present disclosure provides techniques for generating regular expressions that are optimal and detect behaviors of interest. In some examples, the regular expression system may generate a regular expression that has a high probability of matching text patterns of interest using adversarial learning and modification of text strings. In some examples, the regular expression system receives a first plurality of text strings, each text string being indicated either as a "good input" (benign text string) or a "bad input" (malignant text string that has been known to cause or suspected of causing attacks). In an example, a URL that has been associated with an attack string may include digits followed by three special characters. It may be desirable to create an optimized regular expression rule to detect such URLs.

To generate optimized regular expressions, the system may partition a first plurality of text string inputs into a plurality of substrings. For example, the URL "https://www.test.com/testpage.php?param1=633" may be partitioned into the following five substrings: "https", "www.test.com", "testpage", "php", "param1=633". The system creates a token pool including multiple tokens, each token being a unique substring of the plurality of substrings or a predefined regular expression. The regular expression system generates an initial population list including a second plurality of text strings, each text string of the second plurality being created by randomly concatenating tokens in the pool together. For example, a text string in the list may be "www.test.comparam1=633testpage".

The regular expression system iterates through the population list with the purpose of finding optimal text strings that have a high number of matches with one or more malignant text strings (these allow the web application firewall to better identify URLs that match these attacks) and a low number of matches with one or more benign text strings. The system finds these optimal text strings by updating the second plurality of text strings (removing or adding tokens/text strings) included in the population list.

In each iteration of the population list, the regular expression system may calculate a score for one or more text strings in the population list, with the score indicating how close the particular text string matches with malignant text strings and/or benign text strings. A score for a text string may be based at least on a number of matches between the text string and one or more malignant text strings and a number of matches between the text string and one or more benign text strings. In an example, the regular expression system 310 calculates a score for each text string included in the population list. The regular expression system removes those text strings that have a low number of matches with the malignant text strings and/or a high number of matches with the benign text strings. The text strings that are removed typically fit the pattern of benign text strings and are accordingly, not of interest. It may be of no interest to detect URLs that are associated with benign text strings because no special instructions are to be performed for these types of URLs. It may be of interest, however, to detect URLs that are associated with malignant text strings to capture behaviors of interest (e.g., to prevent the URL request from being forwarded to a destination server and a possible attack). Accordingly, it may be desirable to generate a regular expression using adversarial learning and that has a high number of matches to malignant text strings and/or a low number of matches to benign text strings.

In some embodiments, the regular expression system determines whether to update the population list. If the regular expression system determines to update the population list, the regular expression system may modify the second plurality of text strings included in the population list by, for example, breeding and/or mutating one or more text strings. The modification of text strings by breeding and/or mutation will be discussed further below. After modification of the second plurality of text strings, the regular expression system may iterate the population list again.

If, however, the regular expression system determines to not update the list, then an "end condition" has been met. The end condition may be, for example, the maximum number of iterations has been satisfied, the user initiated the stop, or a lack of change in the top or highest scores over a particular number of iterations. At the final iteration, the system may select a set of text strings remaining in the list as special regular expressions, where the selected set of text strings have optimal scores (e.g., a high number of matches with one or more malignant text strings and/or a low number of matches with one or more benign text strings).

Figure 3:
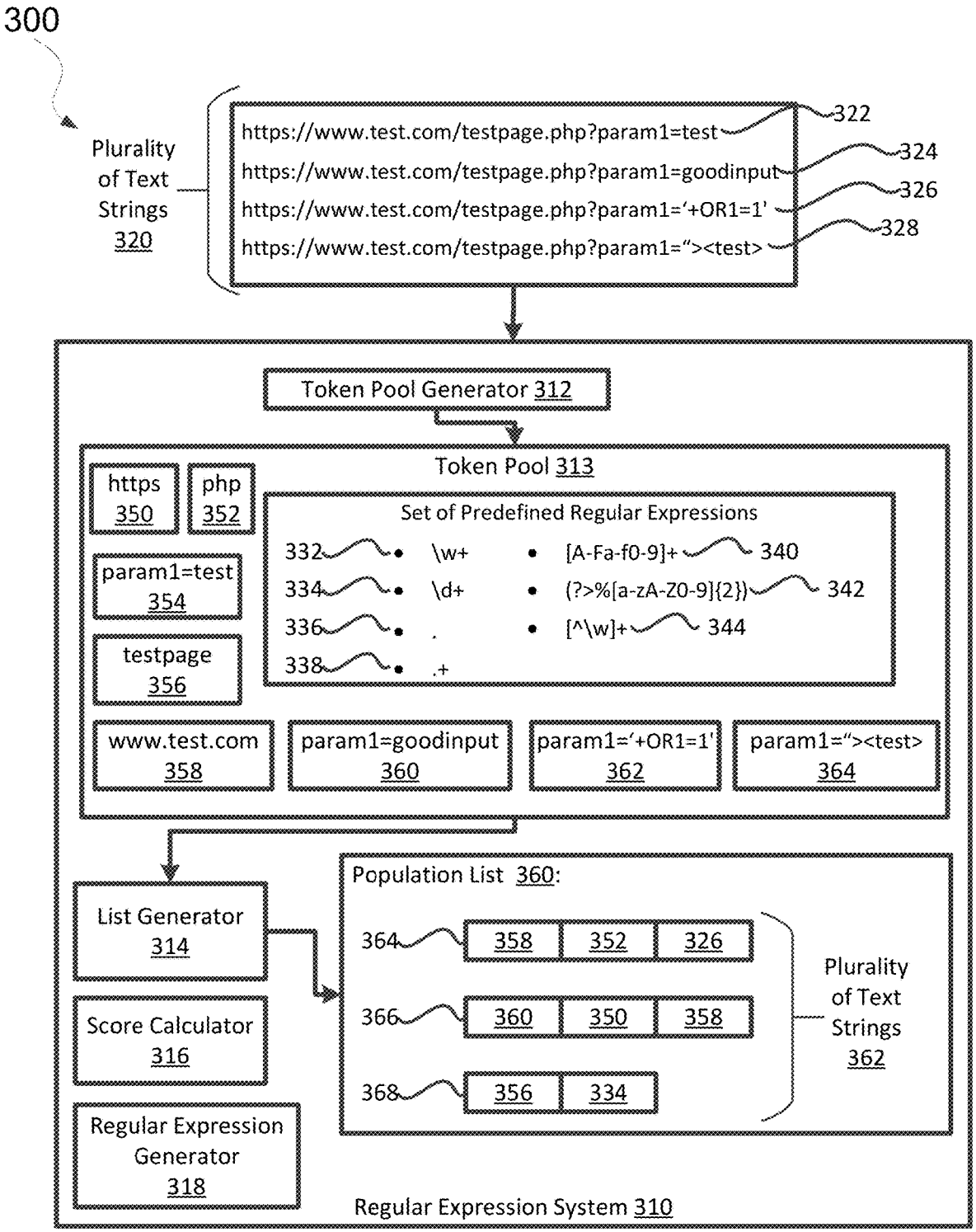
FIG. 3 illustrates an example system for generating a population list including a plurality of text strings according to some embodiments.

FIG. 3 illustrates an example system 300 for generating a population list according to some embodiments. For example, components of diagram 300 may be, in some examples, implemented as part of the example environment 110. The system 300 includes a regular expression system 310 including a token pool generator 312, a list generator 314, a score calculator 316, and a regular expression generator 318. The token pool generator 312 receives a plurality of text strings 320 including a text string 322, a text string 324, a text string 326, and a text string 328. The text string 322 is "https://www.test.com/testpage.php?param1=test", the text string 324 is "https://www.test.com/testpage.php?param1=goodinput", the text string 326 is "https://www.test.com/testpage.php?param1='+OR1=1'", and the text string 328 is "https://www.test.com/testpage.php?param1="><test>".

A. Malignant and Benign Text Strings

Additionally, system 310 may classify each text string of the plurality of text strings 320 as one of a malignant text string or a benign text string. The text strings 322 and 324 are classified as malignant text strings, and the text strings 326 and 328 are classified as benign text strings. A malignant text string is a text string that has been classified as a "bad" text string, and a benign text string is a text string that has been classified as a "good" text string or "not a bad" text string. In an example, a user or an automated process may provide the plurality of text strings 320 to the token pool generator 312. In an example, the user may be security personnel or an administrator familiar with "benign" URLs and how they should look. In some examples, the user may classify those URLs having normal parameters (e.g., not suspicious or has not been known to cause attacks) as benign text strings. The user may classify those URLs that are not benign as "malignant" URLs, which may look suspicious and/or have been known to cause attacks. In some examples, the system 310 may make these classifications.

B. Partition Text Strings into Substrings

The token pool generator 312 creates a token pool 313, each token in the token pool 313 being a predefined regular expression of a set of predefined regular expressions 332-344 or a substring of a plurality of substrings 350-364. The predefined regular expressions 332-344 are added to the token pool 313 for the purpose of making generalized matches, as will be explained further below. The predefined regular expression 332 is "\w+", which matches any word or non-word characters, the predefined regular expression 334 is "\d+", which matches any string of digits, the predefined regular expression 336 is ".", which matches any single character, and the predefined regular expression 338 is ".+", which matches any string of characters until a line break. The predefined regular expression 340 is "[A-Fa-f0-9]+", which matches any hexadecimal number, the predefined regular expression 342 is "(?>%[a-zA-Z0-9]{2})", which matches a social security number, and the predefined regular expression 344 is "[^\w]+", which matches any string of special characters that are not words.

The use of predefined regular expressions 332-344 may result in making generalized matches and shortening the text strings included in the population list 360. If the predefined regular expressions 332-344 were not used, for example, the list generator 314 may generate text strings that are longer than the text strings that the regular expression system 310 is initially attempting to match. In an example, the list generator 314 determines a greatest number of substrings included in a text string of the plurality of text strings 320 and uses the greatest number as a maximum number of tokens per text string of the plurality of text strings 362. Additionally, it should be understood that in other examples, the token pool 313 may include more, fewer, and/or different predefined regular expressions than that provided in the present example.

The token pool generator 312 partitions the plurality of text strings 320 into the plurality of individual substrings 350-364. A text string includes one or more substrings. In the example illustrated in FIG. 3, the substring 350 is "https", the substring 352 is "php", the substring 354 is "param1=test", the substring 356 is "testpage", the substring 358 is "www.test.com", the substring 360 is "param1=goodinput", the substring 362 is "param1='+ OR1=1'", the substring 364 is "param1=''><test>". Each of the tokens included in the token pool 313 may be unique. The token pool may be devoid of duplicate tokens. For example, although each of the text strings 322, 324, 326, and 328 includes the substring 350 "https", the substring 350 "https" is included once in the token pool 313.

In the example illustrated in FIG. 3, it should be understood that the token pool generator 312 may partition any plurality of text strings in accordance with a set of instructions (e.g., based on one or more particular delimiters). In an example, the token pool generator 312 partitions, based on particular characters (e.g., the "://" characters or the "/" character) or query strings (e.g., the "&" character or the "?" character), the plurality of text strings 320 into individual substrings. In another example, the plurality of text strings 320 may be post data that is received from a traffic source after input data is received. The next iteration after receiving input data is receiving post data. In an example, a user may submit her name and credit card number to a website, without the user's name and credit card number showing in the actual URL. Rather, the user's name and credit card number may be submitted to the website using a list that is separated by ampersands in the form of post data. The token pool generator 312 may partition, based on the ampersands, the plurality of text strings 320 into a plurality of substrings. In another example, the plurality of text strings 320 may be submitted via a spreadsheet application storing internal data that is separated by commas. In this example, the token pool generator 312 may partition, based on the commas, the plurality of text strings 320 into a plurality of substrings.

C. Generation and Iteration of the Population List

The list generator 314 may generate a population list 360 including a plurality of text strings 362. The plurality of text strings 362 includes text strings 364, 366, and 368, and each text string of the plurality of text strings 362 includes at least one token. A token may be at least one of a predefined regular expression (e.g., predefined regular expression 332, 334, 336, 338, 340, 342, or 344) and a substring included in the plurality of text strings 320 (e.g., substring 350, 352, 354, 356, 358, 360, 362, or 364). The list generator 314 may select tokens from the token pool 313 and generate, based on the selected tokens, a text string for insertion into the population list 360. In an example, the list generator 314 may randomly combine tokens for generation of one or more text strings of the plurality of text strings 362. The text string 364 includes tokens 358, 352, 326 and is "www.test.com-phpparam1='+OR1=1'"; the text string 366 includes tokens 360, 350, 358 and is "param1=goodinputhttpswww.test.com"; and the text string 368 includes tokens 356 and 334 and is "testpage\d+".

Figure 4:
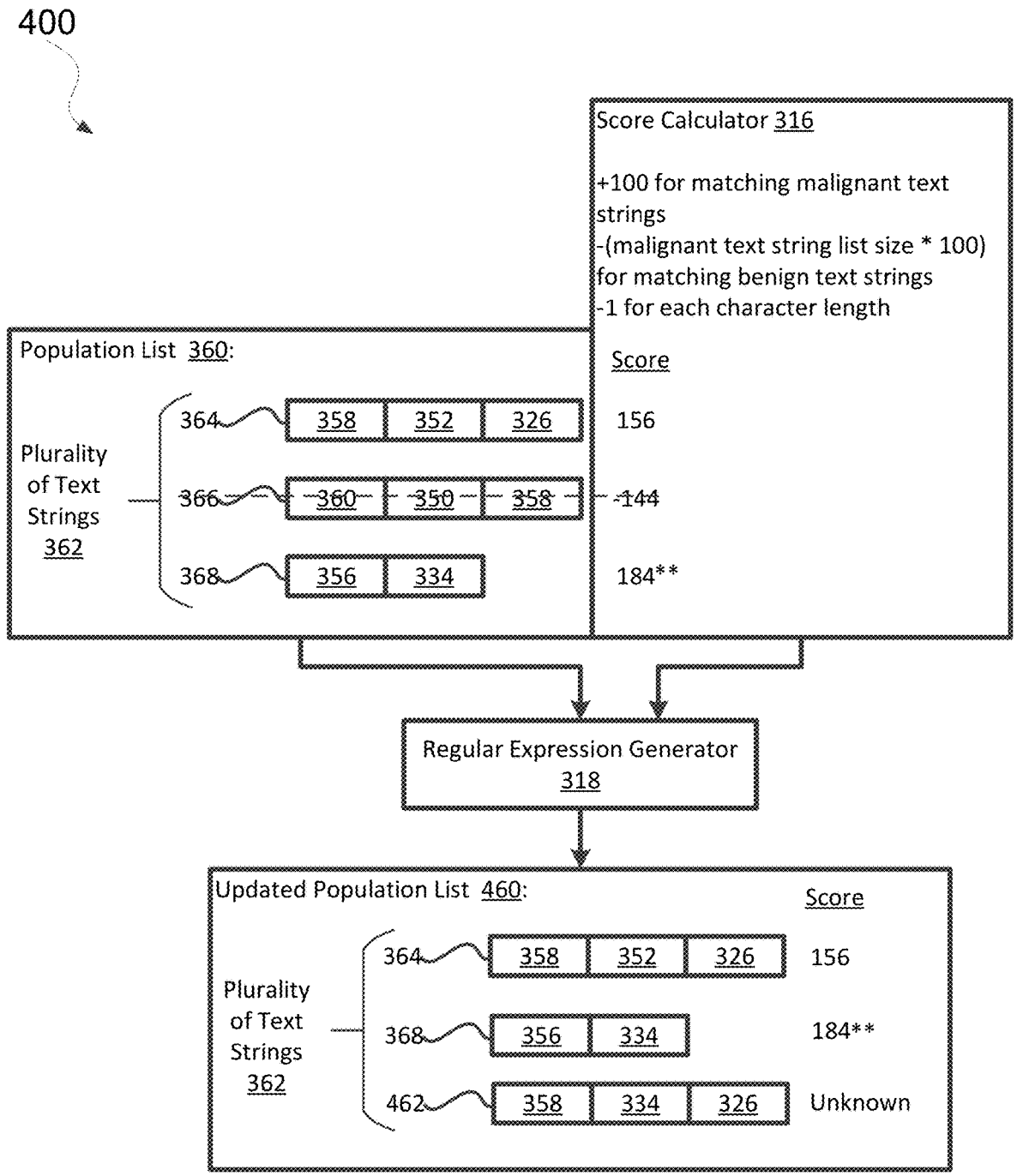
FIG. 4 illustrates an example system for updating the population list according to some embodiments.

The regular expression system 310 creates subsequent iterations of the population list 360 by updating the plurality of text strings 362 included in the population list 360. FIG. 4 illustrates an example system 400 for updating the population list 360 according to some embodiments. In FIG. 4, the regular expression system 310 tests the plurality of text strings 362 included in the population list 360 against each other to identify which text strings have at least one of more matches with malignant text strings and fewer matches with benign text strings. For each iteration of the population list 360, the score calculator 316 calculates a respective score for one or more text strings of the plurality of text strings 362. A score for a text string may be based at least on a number of matches between the text string and one or more malignant text strings and a number of matches between the text string and one or more benign text strings. A match between a given text string and a malignant text string may occur if a substring of the given text string matches a substring of the malignant text string. Similarly, a match between a given text string and a benign text string may occur if a substring of the given text string matches a substring of the benign text string. In an example, a given text string and a malignant text string may result in two matches if they have two matching substrings.

The score calculator 316 calculates the score for each text string of the plurality of text strings 362, which may be different from the plurality of text strings 320. In the example illustrated in FIG. 4, the score calculator 316 calculates the score for a given text string by adding 100 for each malignant text string the given text string matches, subtracting 100 for each benign text string the given text string matches, and subtracting 1 for each character of length of the text string. The score calculator 316 calculates a score of 156 for the text string 364, a score of −144 for the text string 364, and a score of 184 for the text string 368.

During each iteration, the regular expression generator 318 removes one or more text strings from the plurality of text strings 362. The regular expression generator 318 may identify the text string having the lowest score and remove the identified text string. The regular expression generator 318 may remove a first text string if it has at least one of more matches with one or more malignant text strings than a second text string of the plurality of text strings 362 and fewer matches with one or more benign text strings than a second text string. In an example, the regular expression generator 318 removes M text strings from the plurality of text strings 362, where M is a whole number greater than one. In another example, the regular expression generator 318 removes a percentage of text strings from the plurality of text strings 362. The higher the percentage of removed text strings, the more the population list 360 will change. The lower the percentage of removed text strings, the more time it may take to generate the optimal regular expressions.

In the example illustrated in FIG. 4, the regular expression generator 318 removes the text string 366 from the plurality of text strings 362. After the regular expression generator 318 removes the text string 366 (e.g., 33% of the plurality of text strings 362), which is indicated by a strikethrough, the plurality of text strings 362 includes text strings 364 and 368, but does not include the text string 366. It should be understood that this is not intended to be limiting, and the regular expression generator 318 may identify the text string having the highest score and remove this text string, depending on how the scores are calculated.

After removal of the appropriate text strings (e.g., text string 366), the regular expression generator 318 determines whether to update the population list 360. If the regular expression generator 318 determines to update the population list 360, the regular expression generator 318 may breed and/or mutate one or more text strings included in the population list 360 to increase the diversity of the text string population being tested. The regular expression generator 318 may update the population list 360 to a population list 460.

The regular expression generator 318 may determine whether to breed two text strings of the plurality of text strings 362 to create a new text string 462 for insertion into the population list 360. In an example, the regular expression generator 318 breeds N pairs of text strings to generate (N/2) new text strings, where N is a whole number greater than one. This is not intended to be limiting, and two or more text strings may be bred to generate a new text string for inclusion in the population list. In another example, the regular expression generator 318 breeds a percentage of text strings included in the plurality of text strings 362.

In some examples, if the regular expression generator 318 determines to breed text strings of the plurality of text strings 362, the regular expression generator 318 may exempt one or more text strings of the plurality of text strings 362. The exempted text strings may have at least one of more matches with one or more malignant text strings than another text string of the plurality of text strings 362 and fewer matches with one or more benign text strings than another text string of the plurality of text strings 362. By selecting at least one exempted text string for breeding with another text string, the regular expression generator 318 may have a higher chance of reproducing substrings of interest for generating optimal regular expressions. In an example, the regular expression generator 318 selects exempted text strings for breeding, and exempted text strings have a higher chance of being bred and their substrings reproduced to other new text strings inserted into the population list. In the example illustrated in FIG. 4, the regular expression generator 318 may exempt the text string 368, which has the highest score of 184 and is indicated by an asterisk near the text string 368. In an example, the regular expression generator 318 exempts T text strings included in the population list, where T is a whole number greater than one. In another example, the regular expression generator 318 exempts a percentage of the text strings included in the population list. The more text strings that are exempted, the more diverse the new text strings in the updated population list 460 may be, but the longer it may take the regular expression generator 318 to generate the regular expressions. Conversely, the fewer text strings that are exempted, the less diverse the new text strings in the updated population list 460 may be, but the regular expression generator 318 may be able to generate the regular expressions faster.

Substrings from two text strings 364 and 368 may be randomly assigned to create a new text string 462. The regular expression generator 318 may breed a pair of text strings 364 and 368 to generate a new text string. In some examples, the text string 364 includes a first set of substrings in a first order, with the substring 358 being located at a first position, the substring 352 being located at a second position, and the substring 326 being located at a third position. The text string 368 includes a second set of substrings in a second order, with the substring 356 being located at a first position and the substring 334 being located at a second position. Each substring at a position included in the new text string 462 is one of a substring of the first set of substrings at the position in the text string 364 or a substring of the second set of substrings at the position in the text string 368. The regular expression generator 318 may select the substring 358 located at the first position in the text string 364 as the first substring in the new text string 462, the substring 334 located at the second position in the text string 368 as the second substring in the new text string 462, and the substring 326 located at the third position in the text string 364 as the third substring in the new text string 462, preserving the order of the substrings for creation of the new text string 462.

The score calculator 316 has not yet calculated the score for the new text string 462, which includes in order, the text string 358, the text string 334, and the text string 326. After breeding the two text strings 364 and 368, the updated population list 460 includes the text string 364 including the substrings 358, 352, and 326 and having a score of 156, the text string 368 including the substrings 356 and 334 and having a score of 184, and the text string 462 including text strings 358, 334, and 326 and having an unknown score.

Figure 5:
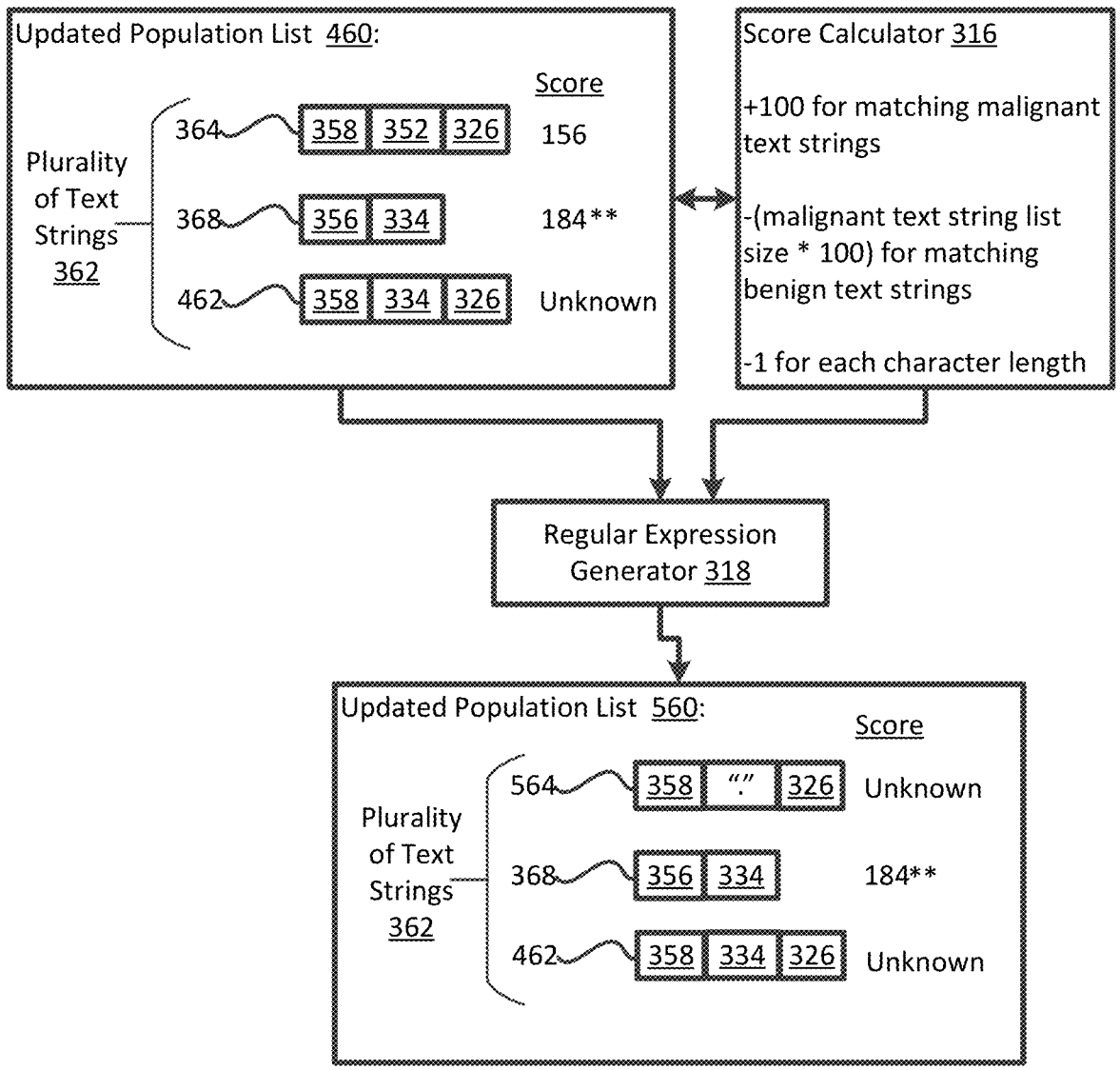
FIG. 5 illustrates an example system for updating the population list according to some embodiments.

FIG. 5 illustrates an example system 500 for updating the population list 460 according to some embodiments. The regular expression generator 318 may determine whether to mutate text strings of the plurality of text strings 362. Mutation of strings introduce randomness and generalization to the process of generating regular expressions. If the regular expression generator 318 determines to mutate text strings, the regular expression generator 318 may first exempt one or more text strings of the plurality of text strings 362 from being mutated and then mutate one or more non-exempt text strings to increase the diversity of the text string population being tested. In an example, the regular expression generator 318 exempts Q text strings included in the population list, where Q is a whole number greater than one. In another example, the regular expression generator 318 exempts a percentage of the text strings included in the population list. The regular expression generator 318 may exempt those text strings that have been identified as having more matches with one or more malignant text strings and/or fewer matches with one or more benign text strings than another text string of the plurality of text strings 362. Accordingly, these exempted text strings will not change.

In FIG. 5, the regular expression generator 318 may exempt the text string 368, which has the highest score of 184 and is indicated by an asterisk near the text string 368. Exempted text strings are exempt from being mutated. The more text strings that are mutated, the more diverse the new text strings in an updated population list 560 will be, but the longer it may take the regular expression generator 318 to generate the regular expressions. Conversely, the fewer text strings that are mutated, the less diverse the new text strings in the updated population list 560 will be, but the regular expression generator 318 may be able to generate the regular expressions faster.

In response to a determination to update the population list, the regular expression generator 318 may update a non-exempt text string by removing a first token from the non-exempt text string or replacing the first token with a second token. In an example, the regular expression generator 318 updates R non-exempt strings by removing a first token from a non-exempt text string or replacing the first token with a second token, where R is a whole number greater than one. In another example, the regular expression generator 318 updates a percentage of text strings from the plurality of text strings 362 by removing a first token from a non-exempt text string or replacing the first token with a second token. In some examples, the regular expression generator 318 selects one or more substrings from a non-exempt text string and mutates the one or more selected substrings. Reference to mutation of a text string may also refer to mutation of a substring included in the text string. The regular expression generator 318 may mutate the text string 364 by selecting a token included in the text string 364 and removing the selected token from the text string 364 or replacing the selected token with another token (e.g., ".", "?", "testpage", etc.). In an example, the regular expression generator 318 mutates the text string 364 by replacing the selected token with the opposite of what the token was before the mutation. For example, if the selected token is "\d+", the regular expression generator 318 may replace this token with "^\d", which will match with characters that are not digits.

In the example illustrated in FIG. 5, the regular expression generator 318 mutates the text string 364 by selecting the second token 352 in the text string 364 and replacing it with the token ".". The regular expression generator 318 may update the text string 364 included in the population list 460 in accordance with the mutated text string. For example, the regular expression generator 318 updates the population list 460 to include the mutated text string 564 in the updated population list 560. Additionally, the score calculator 316 has not yet calculated the score for the mutated text string 564 included in the updated population list 560.

After the regular expression generator 318 updates the population list by modifying the plurality of text strings 362 (e.g., by breeding and/or mutating one or more text strings included in the population list), the regular expression generator 318 may determine whether to create an iteration of the population list again. The updated population list may have fewer text strings than the initial population list. The updated population list includes text strings that may be closer to malignant text strings than benign text strings compared to the prior population list. The regular expression system 310 may perform actions to narrow the population list to include text strings that have a high number of matches with malignant text strings and accordingly, are of interest.

If the regular expression generator 318 determines to create a subsequent iteration of the population list again, the regular expression system 310 may execute the actions discussed above for the iteration. For example, the score calculator 316 may calculate the unknown scores for the appropriate text strings, and the regular expression generator 318 may remove the appropriate text strings from the population list and perform the appropriate actions in response to a determination of whether to update the population list.

If the regular expression generator 318 determines to not update the population list, then an "end condition" has been met. The end condition may be, for example, that the maximum number of iterations has been satisfied, the user initiated the stop, or a lack of change in the top or highest scores over a particular number of iterations. At the final iteration of the population list, the regular expression generator 318 may select a set of text strings remaining in the population list as special regular expressions, where the selected set of text strings have optimal scores (e.g., high number of matches with one or more malignant text strings and/or a low number of matches with one or more benign text strings compared to other text strings in the population list). In an example, in response to a determination to not update the population list, the regular expression generator 318 selects, based on the one or more calculated scores, the text string 368 as a regular expression of the set of regular expressions from a final iteration of the population list. The text string 368 may have at least one of more matches with one or more malignant text strings than a given text string in the population list and fewer matches with one or more benign text strings than the given text string.

III. Operational Flow for Generation of Regular Expressions

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Figure 6:
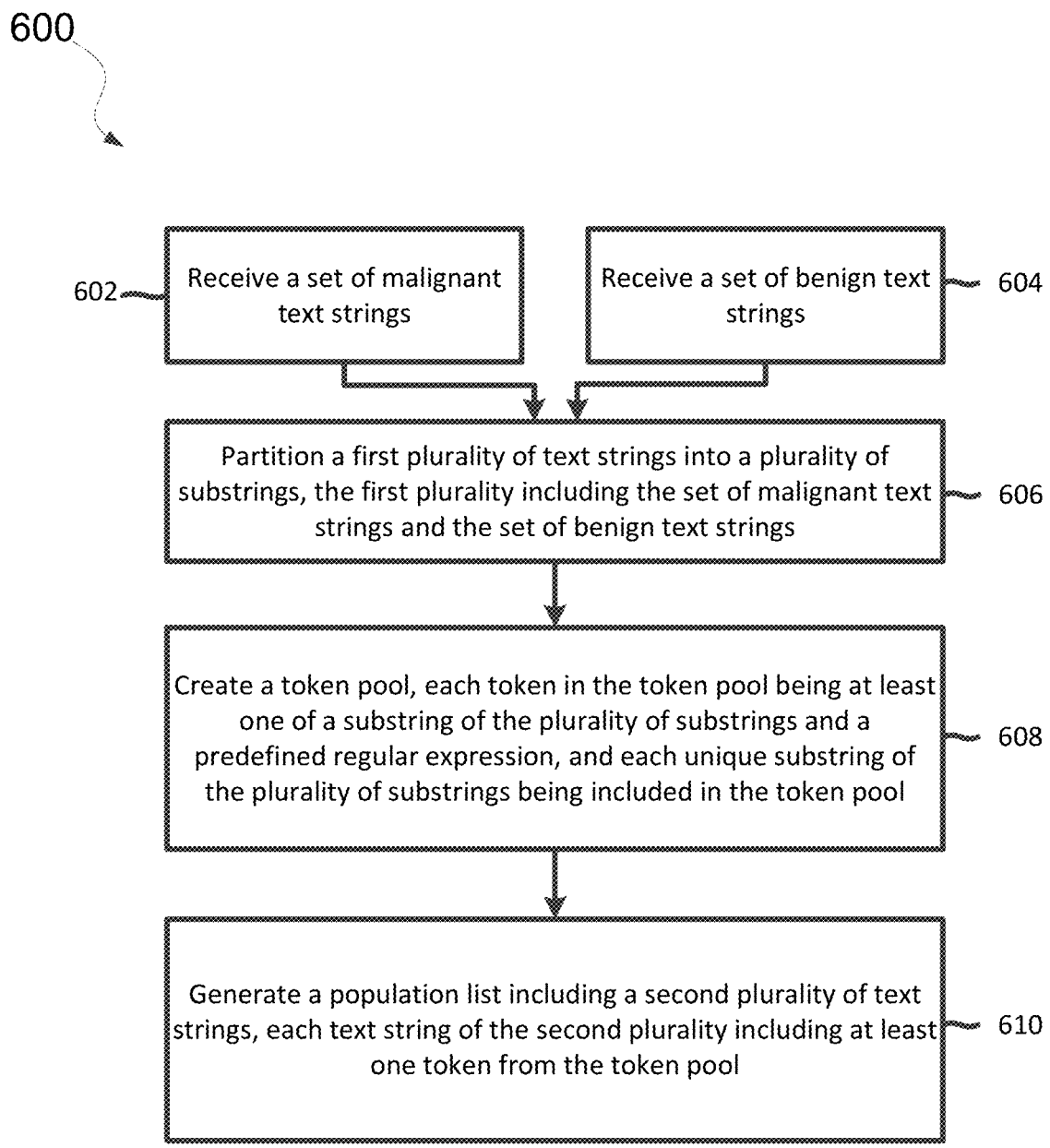
FIG. 6 is a flowchart of a method for generating a population list according to some embodiments.

FIG. 6 is a flowchart of a method 600 for generating a population list according to some embodiments. One or more of the processes 602-610 of the method 600 may be implemented, at least in part, in the form of executable code stored on non-transitory, tangible, machine-readable media that when run by one or more processors may cause the one or more processors to perform one or more of the processes 602-610. In some embodiments, aspects of the processes 602-610 of method 600 can be performed by one or more computing devices in systems or diagrams 100, 200, 300, 400, and 500 of FIGS. 1, 2, 3, 4, and 5, respectively, including the token pool generator 312, the list generator 314, the score calculator 316, and/or the regular expression generator 318. Aspects of the processes 602-610 of method 600 have been covered in the description for FIGS. 1-5; and additional aspects are provided below.

Referring to FIG. 6, at process 602, the token pool generator 312 receives a set of malignant text strings. A user or automated process may provide text strings and classify them as malignant text strings. At process 604, the token pool generator 312 receives a set of benign text strings. The user or automated process may provide text strings and classify them as benign text strings. A text string includes one or more substrings.

At process 606, the token pool generator 312 partitions a first plurality of text strings into a plurality of substrings, the first plurality including the set of malignant text strings and the set of benign text strings. At process 608, the token pool generator 312 creates a token pool, each token in the token pool being at least one of a substring of the plurality of substrings and a predefined regular expression, and each unique substring of the plurality of substrings being included in the token pool.

At process 610, the list generator 314 generates a population list including a second plurality of text strings, each text string of the second plurality including at least one token from the token pool. For each text string of the second plurality of text strings, the list generator 314 may randomly select one or more tokens from the token pool and concatenate the one or more selected tokens to generate the text string.

In some embodiments, one or more actions illustrated in processes 602-610 may be performed for any number of tenants. It is also understood that additional processes may be performed before, during, or after processes 602-610 discussed above. It is also understood that one or more of the processes of method 600 described herein may be omitted, combined, or performed in a different sequence as desired.

Figure 7:
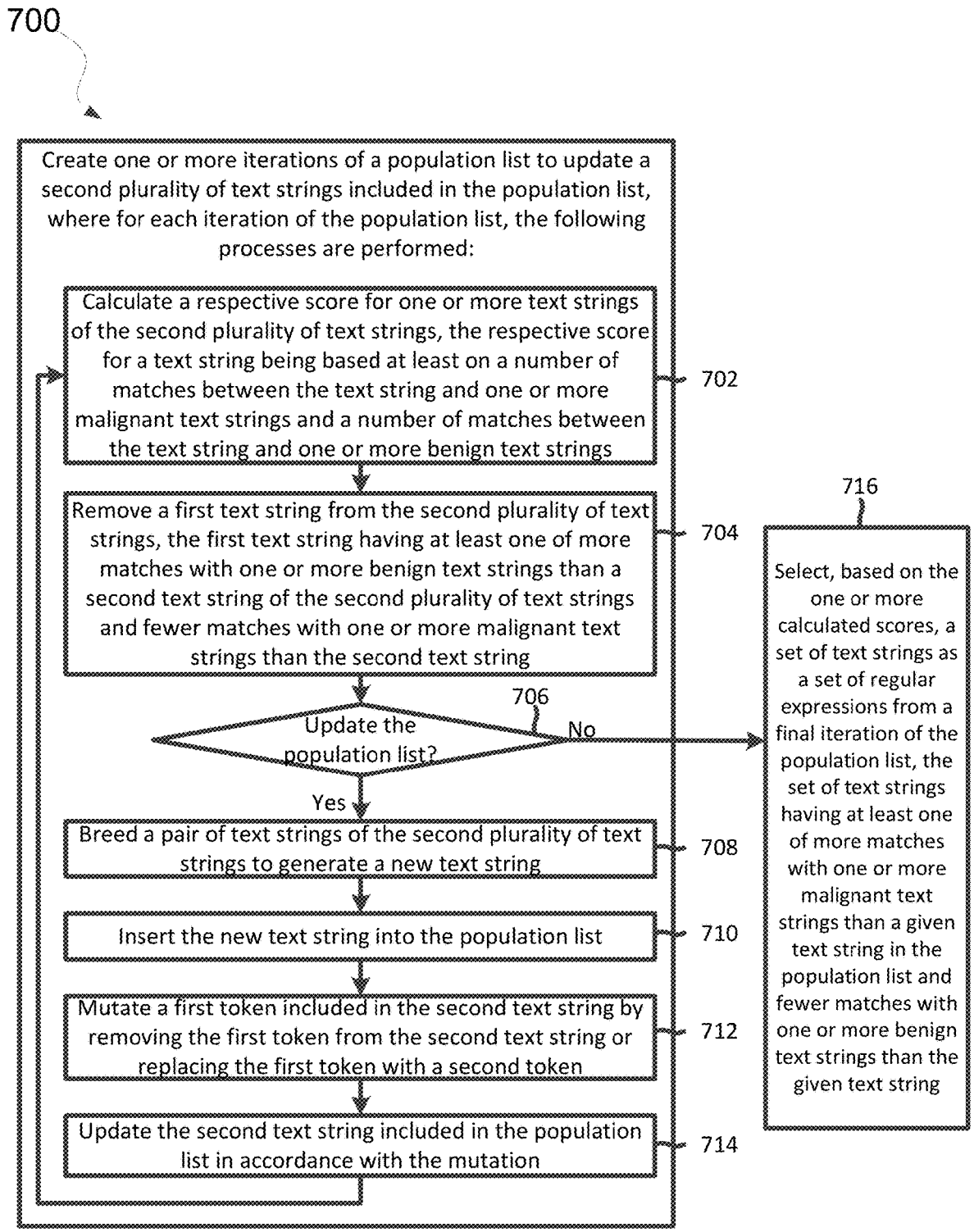
FIG. 7 is a flowchart of a method for obtaining a regular expression according to some embodiments.

FIG. 7 is a flowchart of a method 700 for obtaining a regular expression according to some embodiments. One or more of the processes 702-716 of the method 700 may be implemented, at least in part, in the form of executable code stored on non-transitory, tangible, machine-readable media that when run by one or more processors may cause the one or more processors to perform one or more of the processes 702-716. In some embodiments, aspects of the processes 702-716 of method 700 can be performed by one or more computing devices in systems or diagrams 100, 200, 300, 400, and 500 of FIGS. 1, 2, 3, 4, and 5, respectively, including the token pool generator 312, the list generator 314, the score calculator 316, and/or the regular expression generator 318. Aspects of the processes 702-716 of method 700 have been covered in the description for FIGS. 1-5; and additional aspects are provided below.

Referring to FIG. 7, the regular expression system 310 may create subsequent iterations of a population list by updating a second plurality of text strings included in the population list, where for each iteration of the population list, the regular expression system 310 executes processes 702-716.

At process 702, the score calculator 316 calculates a respective score for one or more text strings of the second plurality of text strings, the respective score for a text string being based at least on a number of matches between the text string and one or more malignant text strings and a number of matches between the text string and one or more benign text strings. If the score is unknown for a text string, the score calculator 316 may calculate the score for the text string. Additionally, the score for a text string may be unknown if the text string was mutated or newly inserted into the population list (e.g., through breeding).

At process 704, the regular expression generator 318 removes a first text string from the second plurality of text strings, the first text string having at least one of more matches with one or more benign text strings than a second text string of the second plurality of text strings and fewer matches with one or more malignant text strings than the second text string.

At process 706, the regular expression generator 318 determines whether to update the population list. If the regular expression generator 318 determines to update the population list, process flow proceeds to process 708. At process 708, the regular expression generator 318 breeds a pair of text strings of the second plurality of text strings to generate a new text string. At process 710, the regular expression generator 318 inserts the new text string into the population list. At process 712, the regular expression generator 318 mutates a first token included in the second text string by removing the first token from the second text string or replacing the first token with a second token. At process 714, the regular expression generator 318 updates the second text string included in the population list in accordance with the mutation. After process 714, process flow proceeds to the process 702.

If, however, the regular expression generator 318 determines to not update the population list, process flow proceeds from process 706 to process 716. At process 716, the regular expression generator 318 selects, based on the one or more calculated scores, a set of text strings as a set of regular expressions from a final iteration of the population list, the set of text strings having at least one of more matches with one or more malignant text strings than a given text string in the population list and fewer matches with one or more benign text strings than the given text string.

In some embodiments, one or more actions illustrated in processes 702-716 may be performed for any number of iterations. It is also understood that additional processes may be performed before, during, or after processes 702-716 discussed above. It is also understood that one or more of the processes of method 700 described herein may be omitted, combined, or performed in a different sequence as desired. For example, the regular expression generator 318 may execute process 708 for each pair of text strings that are bred to create a new text string, and each of these new text strings may be inserted into the population list. In another example, processes 708 and 710 may be removed from the method 700. In another example, the regular expression generator 318 may execute process 712 for each initial text string to be mutated, and update the initial text string in the population list with the mutated text string. In another example, processes 712 and 714 may be removed from the method 700. In another example, processes 708 and 710 occur after processes 712 and 714.

Figure 8:
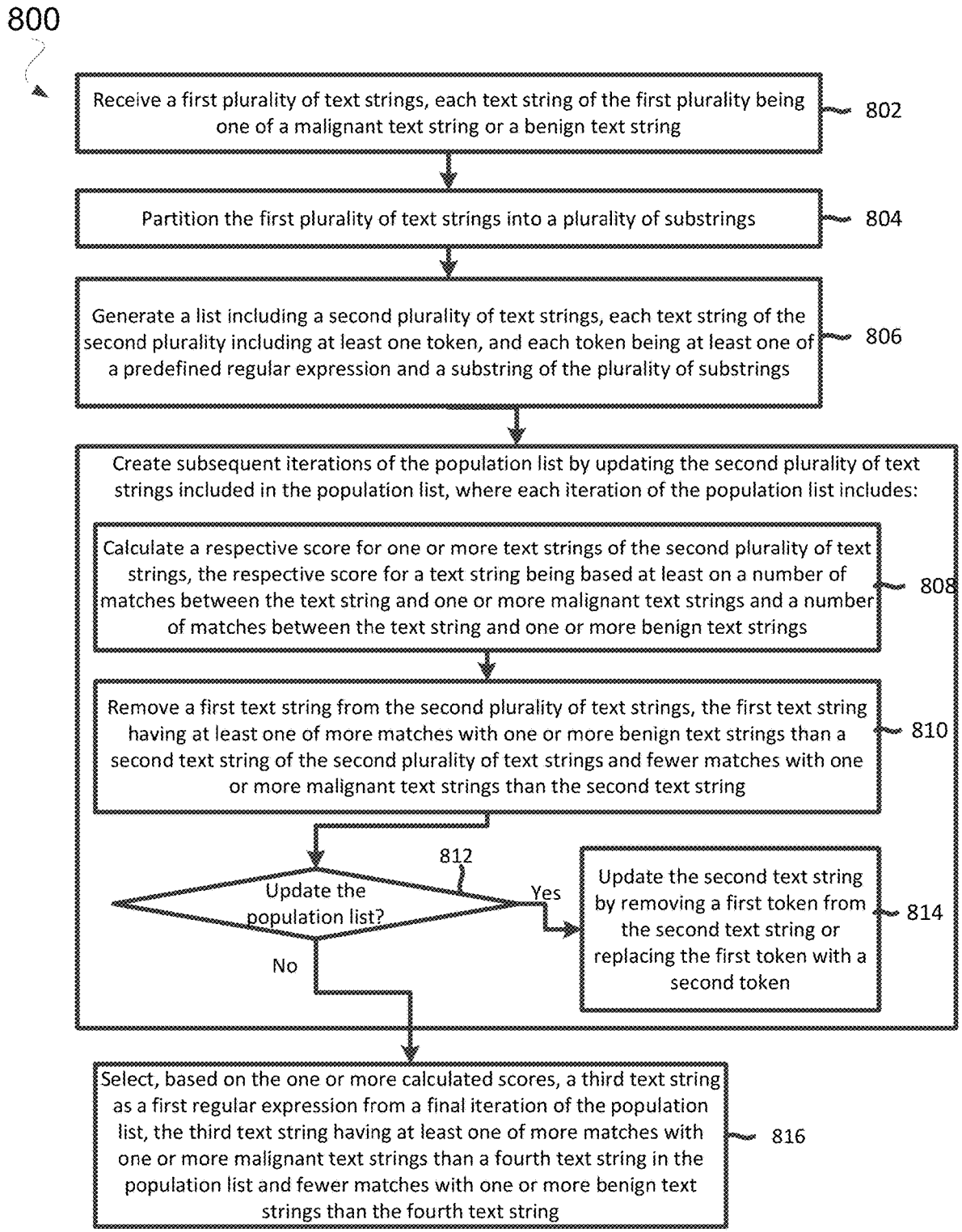
FIG. 8 is a flowchart of a method for obtaining a regular expression according to some embodiments.

FIG. 8 is a flowchart of a method 800 for obtaining a regular expression according to some embodiments. One or more of the processes 802-816 of the method 800 may be implemented, at least in part, in the form of executable code stored on non-transitory, tangible, machine-readable media that when run by one or more processors may cause the one or more processors to perform one or more of the processes 802-816. In some embodiments, aspects of the processes 802-816 of method 800 can be performed by one or more computing devices in systems or diagrams 100, 200, 300, 400, and 500 of FIGS. 1, 2, 3, 4, and 5, respectively, including the token pool generator 312, the list generator 314, the score calculator 316, and/or the regular expression generator 318. Aspects of the processes 802-816 of method 800 have been covered in the description for FIGS. 1-5; and additional aspects are provided below.

Referring to FIG. 8, at process 802, the token pool generator 312 receives a first plurality of text strings, each text string of the first plurality being one of a malignant text string or a benign text string. At process 804, the token pool generator 312 partitions the first plurality of text strings into a plurality of substrings. At process 806, the list generator 314 generates a population list including a second plurality of text strings, each text string of the second plurality including at least one token, and each token being at least one of a predefined regular expression and a substring of the plurality of substrings.

The regular expression system 310 creates subsequent iterations of the population list by updating the second plurality of text strings included in the population list. Each iteration of the population list may include the regular expression generator 318 executing processes 808, 810, 812, and 814. At process 808, the score calculator 316 calculates a respective score for one or more text strings of the second plurality of text strings, the respective score for a text string being based at least on a number of matches between the text string and one or more malignant text strings and a number of matches between the text string and one or more benign text strings. In an example, the score calculator 316 may calculate the score for each text string of the second plurality of text strings. In another example, the score calculator 316 may calculate the score for each text string that has an unknown score. At process 810, the regular expression generator 318 removes a first text string from the second plurality of text strings, the first text string having at least one of more matches with one or more benign text strings than a second text string of the second plurality of text strings and fewer matches with one or more malignant text strings than the second text string.

At process 812, the regular expression generator 318 determines whether to update the population list. If the regular expression generator 318 determines to update the population list, process flow proceeds from process 812 to process 814. At process 814, in response to a determination to update the population list, the regular expression generator 318 updates the second text string by removing a first token from the second text string or replacing the first token with a second token. At process 816, in response to a determination to not update the population list, the regular expression generator 318 selects, based on the one or more calculated scores, a third text string as a first regular expression from a final iteration of the population list, the third text string having at least one of more matches with one or more malignant text strings than a fourth text string in the population list and fewer matches with one or more benign text strings than the fourth text string.

In some embodiments, one or more actions illustrated in processes 802-816 may be performed for any number of iterations. It is also understood that additional processes may be performed before, during, or after processes 802-816 discussed above. It is also understood that one or more of the processes of method 800 described herein may be omitted, combined, or performed in a different sequence as desired. For example, after the process 806, the regular expression system 310 may execute the method 700.

IV. Example Use Case

Figure 9:
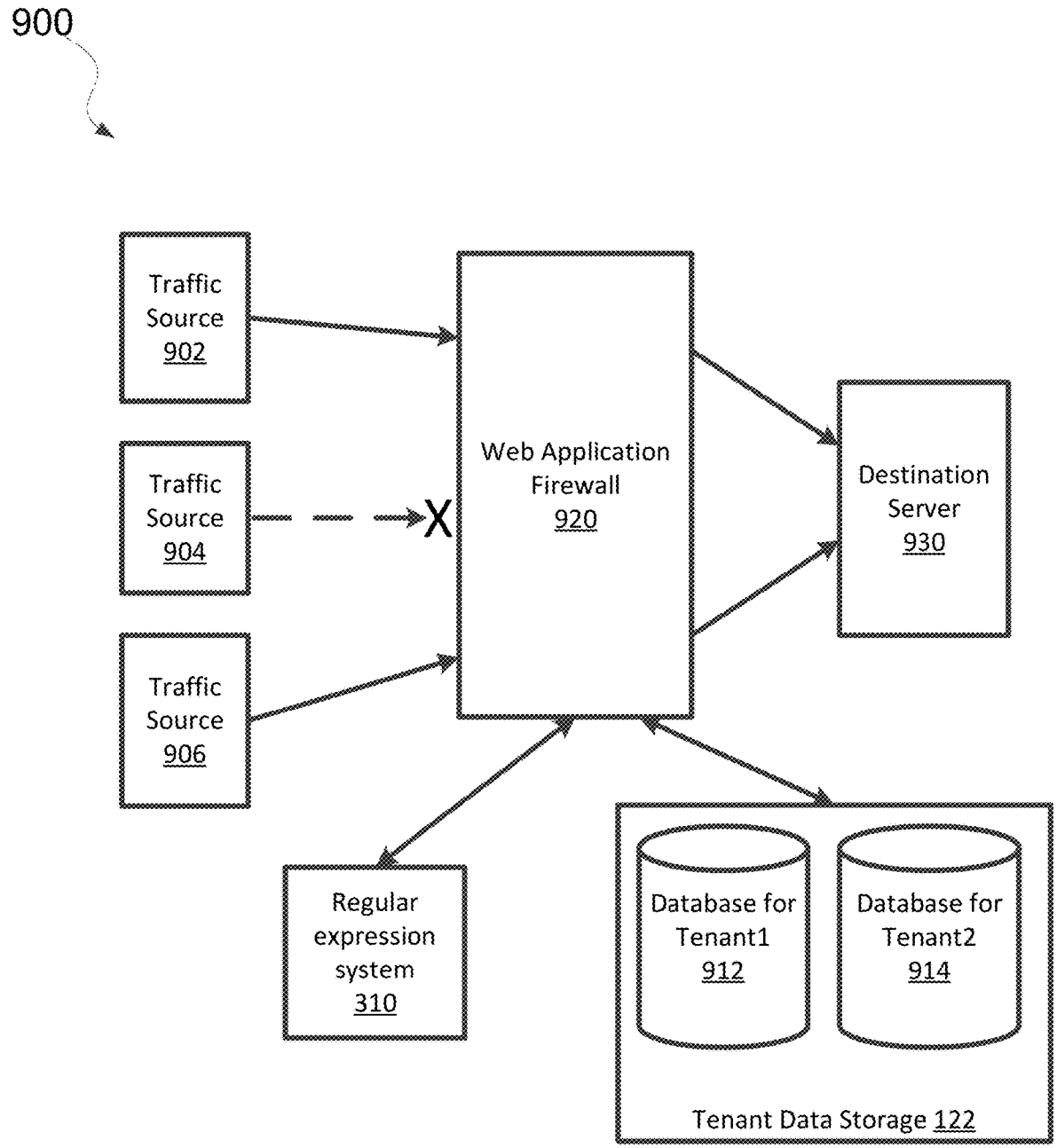
FIG. 9 illustrates an example system for applying the regular expressions stored in a tenant data storage to text strings according to some embodiments.

FIG. 9 illustrates an example system 900 for applying regular expressions stored in the tenant data storage 122 according to some embodiments. In FIG. 9, traffic sources 902, 904, and 906, the tenant data storage 122, a web application firewall 920, and a destination server 930 are coupled over a network (not shown). The network may be a private network (e.g., local area network (LAN), wide area network (WAN), intranet, etc.), a public network (e.g., the Internet), or a combination thereof. The network may include various configurations and use various protocols including virtual private networks, WANS, LANs, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Although one web application firewall, one tenant data storage, and one destination server are illustrated in FIG. 9, this is not intended to be limiting, and system 900 may include more than one web application firewall, more than one tenant data storage, and/or more than one destination server. Additionally, although three traffic sources are illustrated in FIG. 9, this is not intended to be limiting, and system 900 may include more than or fewer than three traffic sources.

The web application firewall 320 is coupled to the tenant data storage 122 that stores internal rules for tenants utilizing data stored in the tenant data storage 122. The regular expression system 310 may store regular expressions into the tenant data storage 122 and maintain the regular expressions by updating them. The web application firewall 920 may use the regular expressions from the tenant data storage 122 as a set of internal rules and apply them to URLs to detect attack strings. In an example, Tenant1 has a first set of regular expressions stored in a database 912 maintained by and/or owned by the Tenant1, and Tenant2 has a second set of regular expressions stored in a database 914 maintained by and/or owned by the Tenant2. The web application firewall 920 may receive a URL request associated with a particular tenant from the traffic source 902 and retrieve, based on the particular tenant, the appropriate set of regular expressions for applying to the URL.

If a regular expression matches the URL, the web application firewall 920 determines that the URL is an attack string and does not pass the URL along to the destination server. In this example, the web application firewall 920 may alert an administrator of the attempted attack. The web application firewall 320 may store information about the traffic source 902 (e.g., Internet Protocol (IP) address) into a log for the administrator to review. If a regular expression does not match the URL, the web application firewall 920 passes the URL along to the destination server for retrieval and return of the webpage stored at the destination server to the traffic source 902.

Unless specifically stated otherwise as apparent from the following discussion, it is appreciated that throughout the description, discussions utilizing terms such as "determining," "obtaining," "inserting," "executing," "receiving," "partitioning," "identifying," "generating," "determining," "performing," "calculating," "removing," "mutating," "updating," "selecting," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modifications, changes and substitutions is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein.

What is claimed is:

1. A computing device for obtaining a regular expression, comprising:
   a communication interface receiving a first plurality of text strings containing at least one of a malignant text string and a benign text string;
   a memory storing a plurality of processor-executable instructions; and
   one or more processors coupled to the memory and configurable to execute the processor-executable instructions to:
   partition the first plurality of text strings into a plurality of substrings;
   create a token pool including one or more tokens, wherein each unique substring of the plurality of substrings is included in the token pool;
   generate a population list including a second plurality of text strings that comprises a second text string of one or more tokens that are chosen from a predefined regular expression and a substring of the plurality of substrings;

iteratively update the second plurality of text strings by computing a respective score for each text string in the second plurality of text strings depending on how the respective text string matches at least one of the malignant text string and the benign text string, and replacing a token in the respective text string with a candidate token that increases a matching level with the benign text string based on the respective score;

create subsequent iterations of the population list by updating the second plurality of text strings included in the population list;

select, based on the computed scores associated with the second plurality of text strings in the population list, a third text string as a first regular expression from the updated second plurality of text strings.

2. The computing device of claim 1, wherein for each iteration of the population list, the one or more processors are configurable to execute the machine executable code to cause the one or more processors to:

calculate a respective score for one or more text strings of the second plurality of text strings, the respective score for a text string being based at least on a number of matches between the text string and one or more malignant text strings and a number of matches between the text string and one or more benign text strings;

remove a first text string from the second plurality of text strings, the first text string having at least one of more matches with one or more malignant text strings than a second text string of the second plurality of text strings and fewer matches with one or more benign text strings than the second text string;

determine whether to update the population list; and in response to a determination to update the population list, update the second text string by removing a first token from the second text string or replacing the first token with a second token.

3. The computing device of claim 1, wherein the one or more processors are further configurable to execute the processor-executable instructions to:

in response to the determination to update the population list, exempt one or more text strings of the second plurality of text strings from being mutated, wherein the one or more exempted text strings have more matches with one or more malignant text strings than another text string of the second plurality of text strings, or wherein the one or more exempted text strings have fewer matches with one or more benign text strings than another text string of the second plurality of text strings.

4. The computing device of claim 1, wherein the one or more processors are further configurable to execute the processor-executable instructions to:

in response to the determination to update the population list:

breed a pair of text strings of the second plurality of text strings to generate a new text string; and insert the new text string into the population list.

5. The computing device of claim 4, wherein the pair of text strings includes a fourth text string and a fifth text string, the fourth text string includes a first set of substrings in a first order, and the fifth text string includes a second set of substrings in a second order, and wherein each substring at a position included in the new text string is one of a substring of the first set of substrings at the position in the fourth text string or a substring of the second set of substrings at the position in the fifth text string.

6. The computing device of claim 3, wherein the one or more processors are further configurable to execute the processor-executable instructions to:

for each text string of the second plurality of text strings:

select one or more tokens from the token pool;

concatenate the one or more selected tokens; and insert the one or more concatenated tokens into the population list.

7. The computing device of claim 1, wherein the one or more processors are further configurable to execute the processor-executable instructions to:

track a number of iterations of the population list;

track a set of highest scores associated with the second plurality of text strings for each iteration of the number of iterations;

determine whether the set of highest scores has changed between the number of iterations;

in response to a determination that the set of highest scores has not changed between the number of iterations, determine to not update the population list; and in response to a determination the set of highest scores has changed between the number of iterations, determine to update the population list.

8. The computing device of claim 1, wherein the one or more processors are further configurable to execute the processor-executable instructions to:

track a number of iterations of the population list, determine whether the number of iterations exceeds a threshold number of iterations;

in response to a determination that the number of iterations exceeds the threshold number of iterations, determine to not update the population list; and in response to a determination that the number of iterations does not exceed the threshold number of iterations, determine to update the population list.

9. A method for obtaining a regular expression, comprising:

receiving a first plurality of text strings containing at least one of a malignant text string and a benign text string;

partitioning the first plurality of text strings into a plurality of substrings;

creating a token pool including one or more tokens, wherein each unique substring of the plurality of substrings is included in the token pool;

generating a population list including a second plurality of text strings that comprises a second text string of one or more tokens that are chosen from a predefined regular expression and a substring of the plurality of substrings;

iteratively updating the second plurality of text strings by computing a respective score for each text string in the second plurality of text strings depending on how the respective text string matches at least one of the malignant text string and the benign text string, and replacing a token in the respective text string with a candidate token that increases a matching level with the benign text string based on the respective score;

creating subsequent iterations of the population list by updating the second plurality of text strings included in the population list;

selecting, based on the computed scores associated with the second plurality of text strings in the population list, a third text string as a first regular expression from the updated second plurality of text strings.

10. The method of claim 9, further comprising:

for each iteration of the population list:
calculating a respective score for one or more text strings of the second plurality of text strings, the respective score for a text string being based at least on a number of matches between the text string and one or more malignant text strings and a number of matches between the text string and one or more benign text strings;
removing a first text string from the second plurality of text strings, the first text string having at least one of more matches with one or more malignant text strings than a second text string of the second plurality of text strings and fewer matches with one or more benign text strings than the second text string;
determining whether to update the population list; and
in response to a determination to update the population list, updating the second text string by removing a first token from the second text string or replacing the first token with a second token.

11. The method of claim 9, further comprising:

in response to the determination to update the population list, exempting one or more text strings of the second plurality of text strings from being mutated, wherein the one or more exempted text strings have more matches with one or more malignant text strings than another text string of the second plurality of text strings, or
wherein the one or more exempted text strings have fewer matches with one or more benign text strings than another text string of the second plurality of text strings.

12. The method of claim 9, further comprising:

in response to the determination to update the population list:
breeding a pair of text strings of the second plurality of text strings to generate a new text string; and
inserting the new text string into the population list.

13. The method of claim 12, wherein the pair of text strings includes a fourth text string and a fifth text string, the fourth text string includes a first set of substrings in a first order, and the fifth text string includes a second set of substrings in a second order, and wherein each substring at a position included in the new text string is one of a substring of the first set of substrings at the position in the fourth text string or a substring of the second set of substrings at the position in the fifth text string.

14. The method of claim 11, further comprising:

for each text string of the second plurality of text strings:
selecting one or more tokens from the token pool;
concatenating the one or more selected tokens; and
inserting the one or more concatenated tokens into the population list.

15. The method of claim 9, further comprising:

tracking a number of iterations of the population list;
tracking a set of highest scores associated with the second plurality of text strings for each iteration of the number of iterations;
determining whether the set of highest scores has changed between the number of iterations;
in response to a determination that the set of highest scores has not changed between the number of iterations, determining to not update the population list; and
in response to a determination the set of highest scores has changed between the number of iterations, determining to update the population list.

16. A computer-readable non-transitory storage medium storing a plurality of processor-executable instructions for obtaining a regular expression, the instructions being issuable by a processor to:

receive a first plurality of text strings containing at least one of a malignant text string and a benign text string;
partition the first plurality of text strings into a plurality of substrings;
create a token pool including one or more tokens, wherein each unique substring of the plurality of substrings is included in the token pool;
generate a population list including a second plurality of text strings that comprises a second text string of one or more tokens that are chosen from a predefined regular expression and a substring of the plurality of substrings;
iteratively update the second plurality of text strings by computing a respective score for each text string in the second plurality of text strings depending on how the respective text string matches at least one of the malignant text string and the benign text string, and replacing a token in the respective text string with a candidate token that increases a matching level with the benign text string based on the respective score;
creating subsequent iterations of the population list by updating the second plurality of text strings included in the population list;
select, based on the computed scores associated with the second plurality of text strings in the population list, a third text string as a first regular expression from the updated second plurality of text strings.

* * * * *